(12) United States Patent
Figueroa

(10) Patent No.: US 8,359,157 B2
(45) Date of Patent: Jan. 22, 2013

(54) COMPUTING NAVIGATION DEVICE WITH ENHANCED ROUTE DIRECTIONS VIEW

(75) Inventor: Joseph Figueroa, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1066 days.

(21) Appl. No.: 12/099,130

(22) Filed: Apr. 7, 2008

(65) Prior Publication Data

US 2009/0254268 A1 Oct. 8, 2009

(51) Int. Cl.
*G01C 21/34* (2006.01)
*G01S 5/00* (2006.01)
*G06F 3/14* (2006.01)

(52) U.S. Cl. ........ 701/430; 701/400; 701/426; 707/743; 707/802

(58) Field of Classification Search .................. 701/201, 701/213, 400, 409, 426, 438; 707/743, 802
See application file for complete search history.

(56) References Cited

U.S. PATENT DOCUMENTS

| | | | | |
|---|---|---|---|---|
| 5,982,298 A * | 11/1999 | Lappenbusch et al. | ....... | 340/905 |
| 6,018,697 A | 1/2000 | Morimoto et al. | | |
| 6,182,010 B1 * | 1/2001 | Berstis | .......... | 701/441 |
| 6,691,128 B2 * | 2/2004 | Natesan et al. | ............. | 701/430 |
| 6,885,939 B2 * | 4/2005 | Schmidt et al. | ............. | 701/428 |
| 6,892,135 B1 * | 5/2005 | Krull et al. | .................... | 701/431 |
| 7,254,249 B2 * | 8/2007 | Rhoads et al. | ................ | 382/100 |
| 7,286,931 B2 | 10/2007 | Kawasaki | | |
| 7,441,204 B2 * | 10/2008 | Thomson et al. | ............ | 715/827 |
| 7,831,380 B2 * | 11/2010 | Chapman et al. | ............ | 701/118 |
| 7,878,392 B2 * | 2/2011 | Mayers et al. | ................ | 235/375 |
| 7,921,114 B2 * | 4/2011 | Figueroa et al. | .............. | 707/743 |
| 7,933,929 B1 * | 4/2011 | McClendon et al. | ......... | 707/802 |
| 7,962,281 B2 * | 6/2011 | Rasmussen et al. | .......... | 701/429 |
| 2006/0155466 A1 | 7/2006 | Kanda et al. | | |
| 2006/0244830 A1 | 11/2006 | Davenport et al. | | |
| 2007/0055441 A1 * | 3/2007 | Retterath et al. | ............. | 701/200 |
| 2007/0061071 A1 | 3/2007 | Torii | | |
| 2007/0118281 A1 * | 5/2007 | Adam et al. | ................... | 701/211 |
| 2009/0254268 A1 * | 10/2009 | Figueroa | ...................... | 701/201 |

FOREIGN PATENT DOCUMENTS

WO  WO2005098362 A1  10/2005
WO  WO2007042846 A1  4/2007

OTHER PUBLICATIONS

Gilroy, "PNDs Move toward Photo-Realistic Displays", Nov. 19, 2007, Reed Business Information, pp. 2.
Gonsalves, "Tom Tom Links GPS Devices to Google Maps", Dec. 5, 2007, CMP Media LLC, pp. 4.
"New Nokia N82 Phone with Integrated Nokia Maps", 2006, Allmaps, pp. 3.

* cited by examiner

*Primary Examiner* — Thomas Black
*Assistant Examiner* — Wae Louie
(74) *Attorney, Agent, or Firm* — Alleman Hall McCoy Russell & Tuttle LLP

(57) ABSTRACT

Systems, methods and a graphical user interface are provided for enhancing a computing navigation device route directions view. A system is disclosed including a computing navigation device configured to identify a route for travel. The route includes one or more geographic locations along the route. The computing navigation device is further configured to receive media from a media service via a computer network, wherein each media includes associated geographic information indicating that the media relates to the one or more geographic locations. The computing navigation device is further configured to display the media in a route directions view of a graphical user interface.

14 Claims, 4 Drawing Sheets

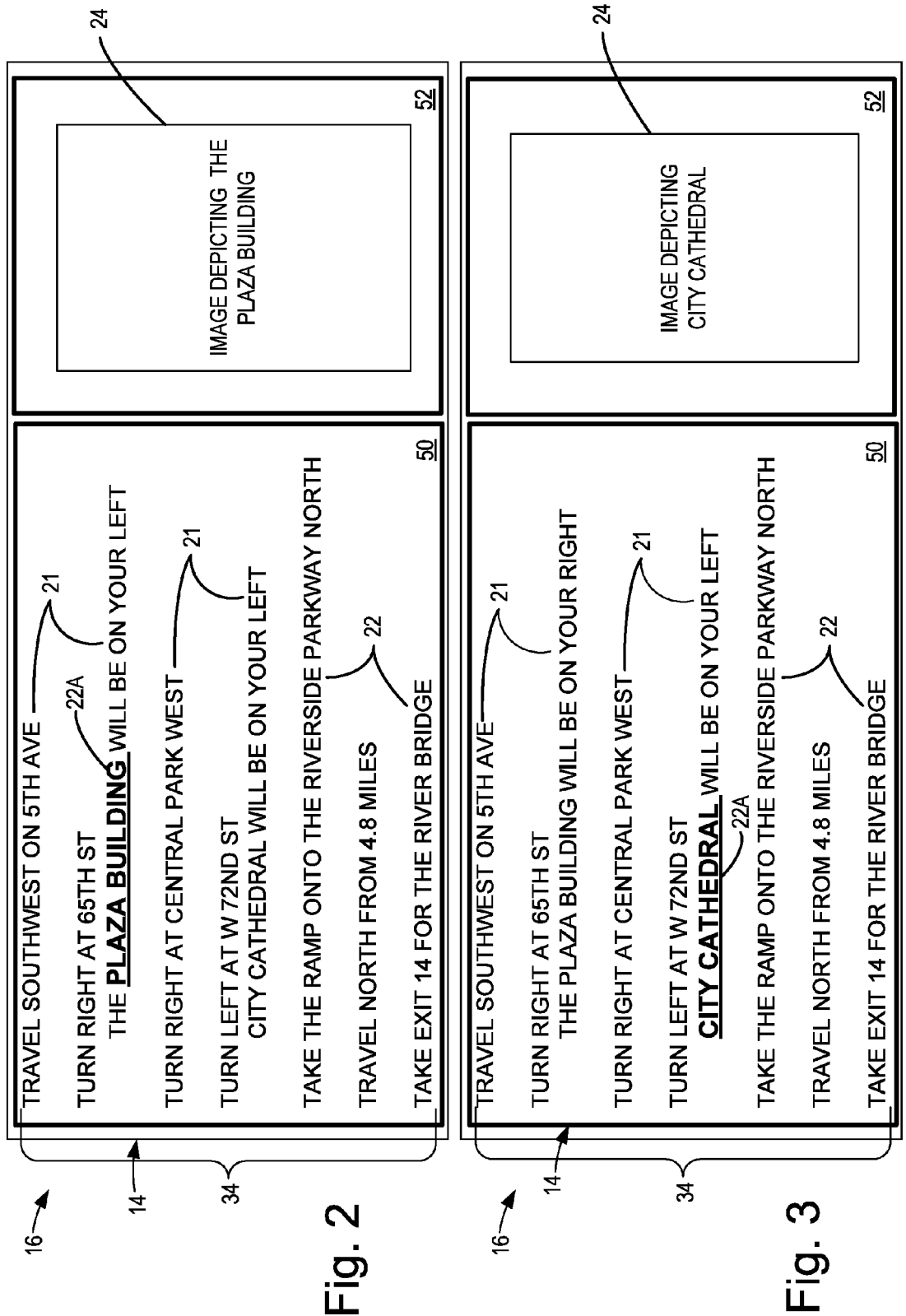

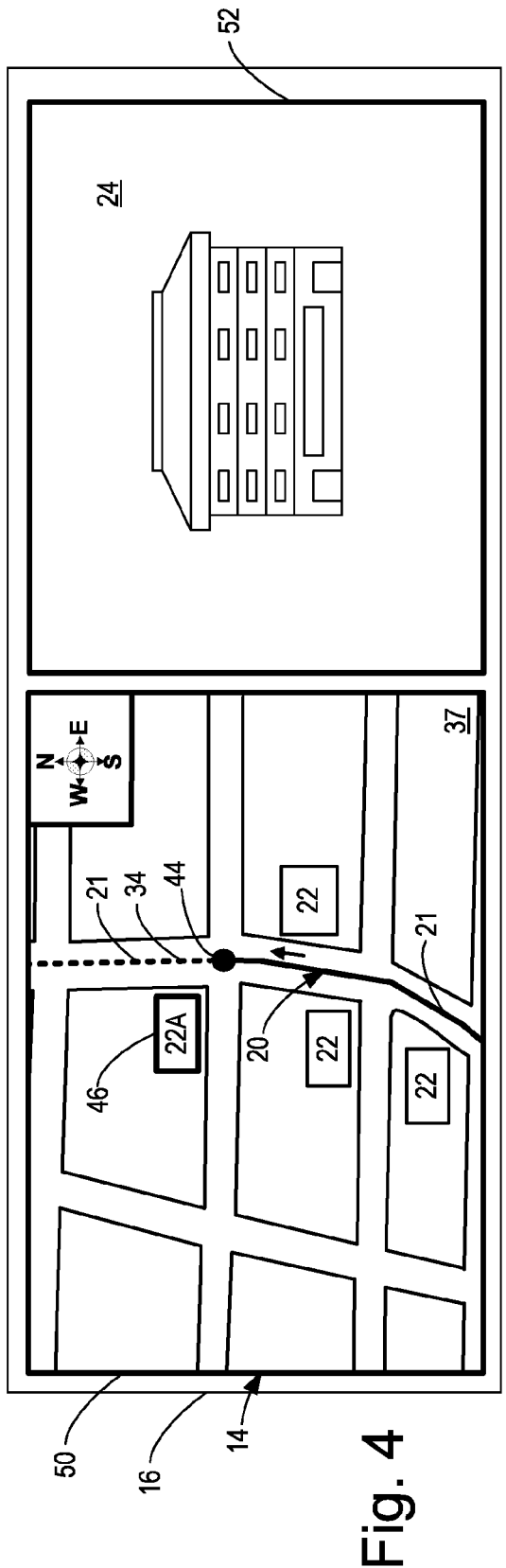
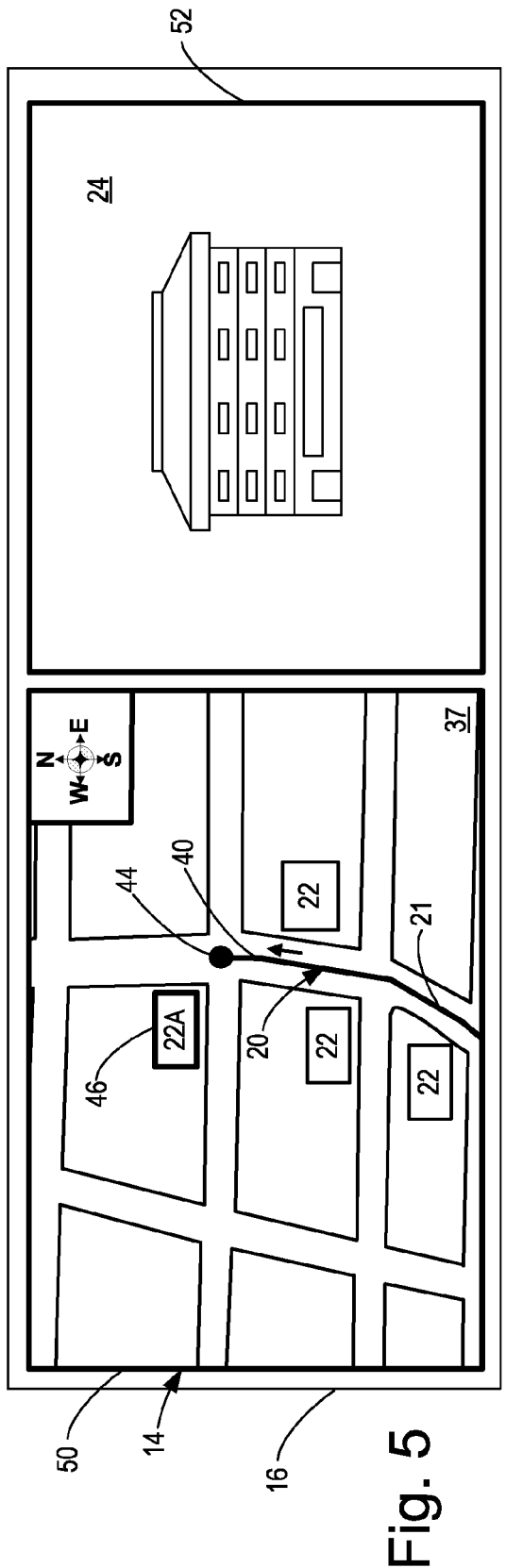
Fig. 4
Fig. 5

COMPUTING NAVIGATION DEVICE WITH ENHANCED ROUTE DIRECTIONS VIEW

BACKGROUND

Computerized geographic information systems have been developed that are able to provide a user with a suggested route from a starting point to a destination. The route may be displayed as textual or map-based directions. One drawback with such systems is that many people have difficulty understanding the textual directions or reading the maps, and may thus become lost or disoriented during travel, even when referring to the computer generated textual or map-based directions.

SUMMARY

Systems, methods and a graphical user interface are provided for enhancing a computing navigation device route directions view. A system is disclosed including a computing navigation device configured to identify a route for travel. The route includes one or more geographic locations along the route. The computing navigation device is further configured to receive media from a media service via a computer network, wherein each media includes associated geographic information indicating that the media relates to the one or more geographic locations. The computing navigation device is further configured to display the media in a route directions view of a graphical user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a schematic view illustrating a graphical user interface of the system of FIG. 1, showing an enhanced route directions view including textual route graphical elements and associated media downloaded from a media service;

FIG. 3 is another schematic view illustrating the graphical user interface with enhanced route directions view of FIG. 2;

FIG. 4 is a schematic view illustrating a graphical user interface of the system of FIG. 1, showing an enhanced route directions view including route graphical elements in a map format and associated media downloaded from a media server;

FIG. 5 is another schematic view illustrating the graphical user interface with enhanced route directions view of FIG. 4.

DETAILED DESCRIPTION

Figure 1:
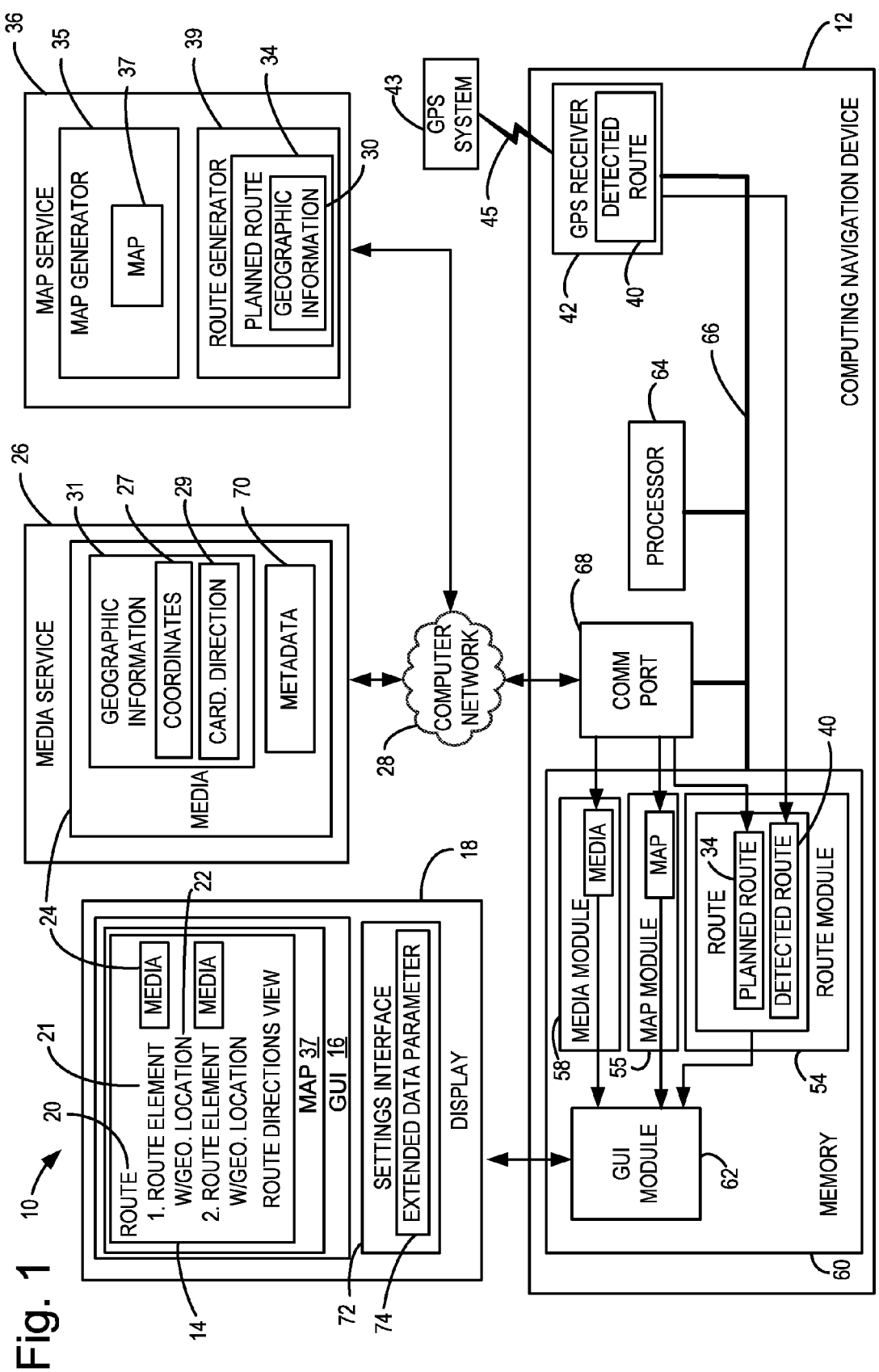
FIG. 1 is a schematic view illustrating a system for enhancing a computing navigation device route directions view.

FIG. 1 illustrates a system 10 for enhancing a route directions view 14 of a computing navigation device 12. The system 10 may include a computing navigation device 12 configured to identify a route 20 for travel. The route 20 may include one or more route elements 21 providing directions for traversing the route, each of the route elements 21 having an associated geographic location 22. The route elements 21 may include textual elements, as illustrated in FIGS. 2 and 3, and/or graphical elements, as illustrated in FIGS. 4 and 5. The route 20 and its constituent route elements 21 may be displayed via a graphical user interface 16 on a display 18 associated with the computing navigation device 12. Media 24 associated with the geographic locations 22 of the route elements 21 may be downloaded from a media service 26 by the computing navigation device 12, and displayed proximate the route elements 21. The media may be created by the media service 26. Alternatively, or additionally, the media 24 may be created and/or uploaded by third party users to the media service 26. Example graphical user interfaces 16 are illustrated in FIGS. 2-5, discussed below.

The computing navigation device 12 may be a desktop computer, laptop computer, handheld computing device, portable navigation device, enhanced mobile telephone device, or other suitable computing device equipped to serve as a navigational aid. It will be appreciated that the computing navigation device 12 may be coupled with, carried on board, or installed in, a vehicle or vessel used to traverse the route 20, or may be handheld and used, for example, by a hiker or pedestrian. The computing navigation device 12 may include a processor 64, memory 60, communications port 68, and geographical positioning system receiver 42, all configured to communicate with each other via a bus 66. The processor 64 may execute various software modules utilizing the memory 60, as described below.

Computing navigation device 12 may be configured to execute a route module 54 to identify the route 20. The route module 54 may be configured to identify different types of routes 20, such as a planned route 34 for travel from a starting point to a destination point, or a detected route 40 of actual travel.

The computing navigation device 12 may be configured to identify the planned route 34, for example, by contacting a server of a map service 36 via a computer network 28 with a route request for a planned route 34 from a user input starting point to a user input destination point, and downloading a planned route 34 from the map service 36. The map service 36 may include a route generator 39 for generating a planned route 34 based on the user input starting point and destination point, among other factors. The planned route 34 may include route geographic information 30 to identify geographic locations 22 along the planned route 34. The route geographic information 30 of the planned route 34 may include, for example, ordered pairs of geographic coordinates indicating latitude and longitude of geographic locations 22 along the planned route 34. The planned route 34 may also include textual or graphical data for the purpose of rendering the route elements 21 of graphical user interface 16.

The map service 36 may also include a map generator 35 for generating a map 37. A map module 55 of the computing navigation device 12 may be configured to contact the map service 36 and download an appropriate map 37 for displaying the route 20 including the route elements 21 with geographic locations 22. The map 37 is typically displayed as an underlay on the route directions view 14, and is overlaid with the route 20. In some embodiments, such as where the route 20 is depicted textually rather than graphically, the map 37 may be omitted. The display of map 37 and planned route 34 may be useful, for example, if a driver wants to obtain directions for driving from a current location to a destination. The planned route 34 may be displayed on the graphical user interface 16, for example, as the user drives on a trip, or when the user is planning a trip. Further, in addition to planned route 34, it will be appreciated that the map 37 may be displayed underlying the detected route 40, discussed below.

The route module 54 of the computing navigation device 12 may be further configured to identify a detected route 40 by requesting the detected route 40 from a global positioning satellite (GPS) receiver 42 associated with the computing navigation device 12. The GPS receiver 42 may be configured to receive signals 45 from a GPS system 43, and compute a detected position of the computing navigation device 12. By storing a plurality of detected positions, a detected route 40 actually traveled by the computing navigation device 12 may be computed by the GPS receiver 42, and passed to the route module 54.

To provide a visual aid for traversing the route 20, a media module 58 of the computing navigation device 12 may be further configured to request and receive media 24 from a media service 26 via the computer network 28, such as the Internet. The media 24 may include images and/or video, for example. Other media, such as audio or animations, may also be utilized. Each media 24 may include associated media geographic information 31, which may be used to determine whether the media relates to the one or more of the geographic locations 22 in the route 20. The media geographic information 31 may include, for example, geographic coordinates 27, including latitude and longitude values, for associating the media 24 with the one or more geographic locations 22. The media geographic information 31 may also include cardinal direction 29, which indicates the compass direction in which the media was captured.

The media module 58 may be configured to send a request to the media service 26 for media 24 having media geographic information 31 indicating the media 24 are associated with a geographic location 22 of the route 20, for example, by passing the coordinates 27, and/or cardinal direction 29 of the geographic locations 22 of the route 20 to the media service 26, which may in turn match appropriate media 24 for download that have a corresponding coordinates 27, and/or cardinal direction 29 to the geographic locations 22 of the route 20.

The media 24 at the media service 26 may include associated metadata 70 to identify the media 24 as having been captured under predetermined conditions at the one or more geographic locations 22. The graphical user interface 16 may include a settings interface 72 that may be configured to receive a user selected extended data parameter 74 to select media 24 to be downloaded from the media service 26 as having been captured under a selected predetermined condition. The metadata 70 may include weather information, traffic conditions, road conditions, time and date, day or night, etc. The extended data parameter 74 may be sent to the media service 26, which in turn may select appropriate media 24 having matching metadata for download to computing navigation device 12. Thus, by inputting extended data parameters 74 in this manner, a user may cause media 24 taken under specified conditions to be displayed. For example, if a user desires to see media of a national monument at night, or in the snow, such extended data parameters 74 may be entered for matching with metadata 70.

A graphical user interface module 62 of the computing navigation device 12 may be further configured to receive the media 24 from the medial module 58, the map 37 from the map module 55, and the route 20 (in the form of either a detected route 40 or planned route 34), and display these elements on the graphical user interface 16 on display 18. The graphical user interface module 62 may be configured to display media 24 proximate the route 20 in the route directions view 14 of the graphical user interface 16.

For example, the media 24 may be displayed proximate route elements 21 with geographic locations 22 that correspond to the media geographic information 31 associated with each media 24. In some embodiments, the route elements 21 may be textual and the media 24 may be displayed proximate the textual elements. In other embodiments, the route elements 21 may be graphical route elements displayed on a map 37, and the media 24 may be displayed in an overlay on the map 37. In this manner, media associated with a place through which the user is traveling or plans to travel may be displayed to provide the user a visual aid to navigation.

FIGS. 2 and 3 illustrate instances of an example graphical user interface 16 including a route directions view pane 50 configured to display a route directions view 14 and a media pane 52 configured to display media 24. The media pane 52 may be configured to display media 24 corresponding to the one or more geographic locations 22 along the route 20. As previously described, the media 24 are selected from the media service 26 to have geographic information that corresponds to the geographic locations 22 in the route elements 21 of the route 20 displayed in the route directions view pane 52. Examples of media 24 include images and/or video captured at the geographic location 22, which may be taken from a street-level, aerial, or other perspective, and may feature landmarks, streetscapes, and other imagery that may serve as a navigational guide to the route 20.

The media 24 may be displayed to the user prior to travel as the user previews a planned route 34, for example, using a computing navigation device at home, or during travel as the user traverses the planned route 34 with a portable computing navigation device. When the user traverses the planned route 34, the route module 54 is configured to receive signals from the GPS receiver 42 that indicate the computing navigation device is at a detected geographic position 22A along the planned route 34, and to highlight, e.g. via bold and underlined text or other manner, a textual element indicating the geographic location 22. In the depicted embodiment, The Plaza Building is highlighted in this manner in FIG. 2, and City Cathedral is highlighted in FIG. 3. In response to detection of a position of the computing navigation device 12 at a geographic location along the planned route 34, the media module 58 is configured to download and cause the GUI module 62 to display media 24 that corresponds to the geographic location 22. Thus, in FIGS. 2 and 3, an image of The Plaza Building and an image of City Cathedral, which have been downloaded from media service 26, are displayed adjacent respective detected geographic locations 22A of each building.

FIGS. 4 and 5 illustrate a graphical user interface 16 configured to display in a route pane 50, a route 20 that has route elements 21 that include graphical elements, such as dashed and dotted lines, which are overlaid on map 37. FIG. 4 depicts a planned route 34 in dashed lines, a traveled route in solid lines, and a detected position of the computer navigation device at current position indicator 44. FIG. 5 depicts a detected route 40, with a current position of the computing navigation device indicated by current position indicator 44. In the graphical user interfaces 16 of each of FIGS. 4 and 5, the computing navigation device is configured to determine that a detected geographic location 22A is proximate the detected position of the computing navigation device 12, and to download and display media 24 that correspond to the detected geographic location 22A. The detected geographic location 22A may be highlighted graphically, such as with a bold border, or in another manner, to visually indicate to a user that the media 24 displayed in media pane 52 corresponds with the highlighted detected geographic location 22A.

In addition to displaying media 24 upon detection that the computer navigation device is at a detected geographic location 22A, the computing navigation device 12 may be configured to enable the user to select which media 24 are displayed, by selecting the textual or graphical elements indicative of geographic locations 22 along route 20. In this manner, media 24 corresponding to a geographic may be displayed after one of the geographic locations 22 is selected by, for example, clicking with a curser or other selection mechanism. This may enable a user to preview media 24 associated with geographical locations 22 along a route 20, without physically traversing the route. In other embodiments, the graphical user interface 16 may scroll though a series of media 24 corresponding to a plurality of geographic locations along a route 20 at a predetermined frequency to tour the user along the route.

Figure 6:
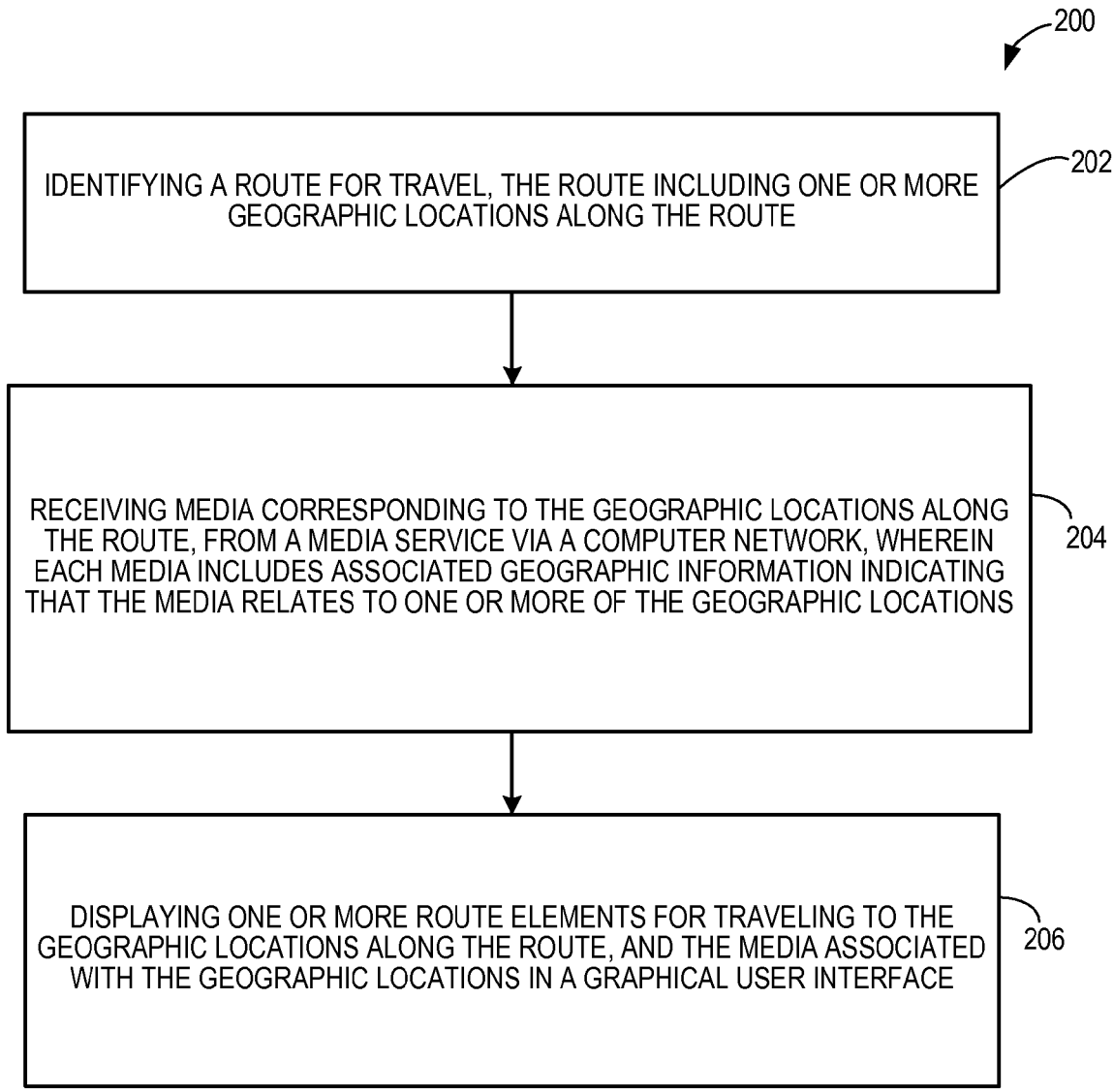
FIG. 6 is a flowchart illustrating one embodiment of a method for enhancing a computing navigation device route directions view.

FIG. 6 is a flowchart illustrating an embodiment of a method 200 for enhancing a computing navigation device route directions view. Method 200 may be implemented using the systems and devices described above, or using other suitable hardware. The method may include, at 202, identifying a route for travel. The route may include one or more geographic locations along the route. At 204, the method may include receiving media corresponding to the geographic locations along the route, from a media service via a computer network. Each media may include associated geographic information indicating that the media relates to one or more of the geographic locations. At 206, the method may also include displaying one or more route elements for traveling to the geographic locations along the route, and the media associated with the geographic locations in a graphical user interface. The route elements may be displayed as textual elements and/or graphical elements, and may be displayed overlying a map.

Some embodiments may provide a method 200 that may further include receiving a user selected extended data parameter for selecting one or more extended data types. The extended data types may be selected from the group consisting of weather information, traffic conditions, road conditions, time and date, day or night, etc.

Example Use Scenario

A user may input a destination address via the graphical user interface 16 of the computing navigation device 12, which may then identify the route 20 and begin to download images and/or video from the media service 26 of landmarks at various points along the route, which correspond to certain geographic locations 22. The graphical user interface 16 of the computing navigation device 12 may display textual or graphical directions for traveling along the route, for example, and corresponding images or video of a landmark corresponding to each direction. The user may study the planned route before travel, by clicking through the directions and displaying the images and video of landmarks along the route, and/or may view the landmarks displayed as the user travels the route. In this manner the user may recognize the route more easily, based on the images and video of recognizable landmarks along the route, of the road itself, etc. To further improve recognition of the route, the user may enter extended data parameters, such as "nighttime" and "snow" when traversing a route under these conditions, in order to view media that were taken along the route under similar conditions.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, enhanced mobile telephone device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for enhancing a computing navigation device route directions view, comprising:
   a computing navigation device configured to:
   execute a route module, the route module configured to identify a route for travel, the route including one or more geographic locations along the route;
   execute a graphical user interface including a settings interface configured to receive a user selected extended data parameter to selectively download media that have been captured under a selected predetermined condition;
   execute a media module, the media module configured to send a request to a media service via a computer network, the request comprising the user selected extended parameter and one or more of coordinates and cardinal direction of the geographic locations of the route, and the media module being further configured to receive, responsive to the request, media from the media service, wherein each media includes associated geographic information indicating that the media relates to the one or more geographic locations, and wherein at least some of the media at the media service includes metadata to identify the media as having been captured under predetermined conditions at the one or more geographic locations, wherein the metadata identifies the media as being one or more extended data types being selected from the group consisting of weather information, traffic conditions, road conditions, time, date, day, and night; and
   execute a map module, the map module being configured to contact a map service via the computer network and download a map and one or more graphical elements from the map service indicative of the route for travel,
   wherein the graphical user interface module is further configured to display the media in a route directions view of the graphical user interface in response to a user input to display the media.

2. The system of claim 1, wherein the route is a planned route for travel.

3. The system of claim 1, wherein the route is a detected route of travel, and wherein the computing navigation device further includes a global positioning system receiver configured to determine the one or more geographic locations along the route.

4. The system of claim 1, wherein media includes images and/or video.

5. The system of claim 1, wherein the route module is further configured to receive global position coordinates from a GPS system indicative of a detected route of travel.

6. The system of claim 1, wherein the graphical user interface includes a route pane for displaying the route, and a media pane for displaying the media.

7. A method for enhancing a computing navigation device route directions view comprising:
- sending, a route request to a map service via a computer network for a planned route from a user input starting point to a user input destination point;
- receiving, responsive to the route request, a route for travel, the route including one or more geographic locations along the route;
- receiving a user selected extended data parameter for selecting one or more extended data types, wherein the extended data types are selected from the group consisting of weather information, traffic conditions, road conditions, time, date, day, and night;
- sending a request to a media service via the computer network, the request comprising the user selected data parameter and one or more of coordinates and cardinal direction of the geographic locations of the route;
- receiving, responsive to the request, media corresponding to the geographic locations along the route, from the media service via the computer network, wherein each media includes associated geographic information indicating that the media relates to one or more of the geographic locations;
- displaying one or more route elements for traveling to the geographic locations along the route; and
- displaying the media associated with the geographic locations in a graphical user interface in response to a user input to display the media.

8. The method of claim 7, wherein the route elements include graphical elements displayed on a map.

9. The method of claim 7, wherein the route elements include text elements configured to provide instructions to traverse the route for travel.

10. A graphical user interface of an enhanced computing navigation device route directions view comprising:
- a route pane configured to display a route including one or more route elements, each route element having an associated geographic location along the route, the route and route elements being received, responsive to a route request, from a map service via a computer network;
- a settings interface configured to receive a user selected extended data parameter to selectively download media that have been captured under a selected predetermined condition; and
- a media pane configured to display media corresponding to the one or more geographic locations along the route in response to a user input to display the media, the media including geographic information used to associate the media with the geographic locations, and being downloaded responsive to a request from a media service via the computer network, the request comprises the user selected data parameter, wherein at least some of the media downloaded from the media service includes metadata to identify the media as having been captured under predetermined conditions at the one or more geographic locations, wherein the geographic information includes one or more of coordinates and cardinal direction of the geographic locations of the route.

11. The graphical user interface of claim 10, wherein the media includes images and/or video.

12. The graphical user interface of claim 11, wherein the images include one more of a street view, an aerial view, and video depicting movement along the route.

13. The graphical user interface of claim 10, wherein the one or more route elements include graphical elements displayed on a map and/or textual elements providing instructions to traverse the route.

14. The graphical user interface of claim 10, further comprising a settings interface configured to receive a user selected extended data parameter for selecting one or more extended data types wherein the extended data types are selected from the group consisting of weather information, traffic conditions, road conditions, time, date, day, and night.

* * * * *